United States Patent
Sherman et al.

(10) Patent No.: US 11,872,628 B2
(45) Date of Patent: Jan. 16, 2024

(54) LOW THERMAL STRESS METAL STRUCTURES

(71) Applicant: Powdermet, Inc., Euclid, OH (US)

(72) Inventors: Andrew J. Sherman, Mentor, OH (US); Brian Werry, Euclid, OH (US)

(73) Assignee: Powdermet, Inc., Euclid, OH (US)

( * ) Notice: Subject to any disclaimer, the term of this patent is extended or adjusted under 35 U.S.C. 154(b) by 1547 days.

(21) Appl. No.: 16/110,600

(22) Filed: Aug. 23, 2018

(65) Prior Publication Data

US 2019/0126349 A1    May 2, 2019

Related U.S. Application Data

(60) Continuation-in-part of application No. 14/752,166, filed on Jun. 26, 2015, now Pat. No. 10,092,954, which is a division of application No. 13/445,810, filed on Apr. 12, 2012, now Pat. No. 9,096,034.

(60) Provisional application No. 62/549,704, filed on Aug. 24, 2017, provisional application No. 61/474,712, filed on Apr. 12, 2011.

(51) Int. Cl.
| | |
|---|---|
| *C22C 32/00* | (2006.01) |
| *B22F 3/11* | (2006.01) |
| *C22C 49/06* | (2006.01) |
| *C22C 49/11* | (2006.01) |
| *C22C 49/00* | (2006.01) |
| *B22F 3/16* | (2006.01) |
| *B32B 5/20* | (2006.01) |
| *B32B 5/16* | (2006.01) |
| *B21D 3/00* | (2006.01) |
| *B32B 5/18* | (2006.01) |
| *C22C 1/10* | (2023.01) |

(52) U.S. Cl.
CPC ............. *B22F 3/1112* (2013.01); *B21D 3/00* (2013.01); *B22F 3/16* (2013.01); *B32B 5/16* (2013.01); *B32B 5/18* (2013.01); *B32B 5/20* (2013.01); *C22C 32/0031* (2013.01); *C22C 32/0036* (2013.01); *C22C 32/0078* (2013.01); *C22C 49/00* (2013.01); *C22C 49/06* (2013.01); *C22C 49/11* (2013.01); *B22F 2003/1106* (2013.01); *B22F 2998/10* (2013.01); *B22F 2999/00* (2013.01); *C22C 1/1084* (2013.01)

(58) Field of Classification Search
None
See application file for complete search history.

(56) References Cited

U.S. PATENT DOCUMENTS

| | | | | |
|---|---|---|---|---|
| 4,406,699 | A * | 9/1983 | Beck .................... | C04B 35/486 75/235 |
| 4,751,048 | A * | 6/1988 | Christodoulou ....... | B23K 35/40 420/129 |

(Continued)

*Primary Examiner* — George Wyszomierski
(74) *Attorney, Agent, or Firm* — Ulmer & Berne LLP; Brian E. Turung

(57) ABSTRACT

A structured three-phase composite which include a metal phase, a ceramic phase, and a gas phase that are arranged to create a composite having low thermal conductivity, having controlled stiffness, and a CTE to reduce thermal stresses in the composite when exposed to cyclic thermal loads. The structured three-phase composite is useful for use in structures such as, but not limited to, heat shields, cryotanks, high speed engine ducts, exhaust-impinged structures, and high speed and reentry aeroshells.

23 Claims, 9 Drawing Sheets

(56) References Cited

U.S. PATENT DOCUMENTS

| | | | | |
|---|---|---|---|---|
| 6,407,022 B1 * | 6/2002 | Sandhage | ............ | C22C 1/1036 |
| | | | | 501/80 |
| 2006/0172142 A1 * | 8/2006 | Olson | .................... | C22C 30/00 |
| | | | | 420/425 |
| 2011/0146848 A1 * | 6/2011 | Bewlay | ................... | C22C 27/02 |
| | | | | 148/423 |

* cited by examiner

Table I - Compression Properties

| Material | Alloy | Density g/cc | Peak compression strength PSI | Plateau comp. strength RT PSI | Comp strength @ 600C° PSI |
|---|---|---|---|---|---|
| CP-Ti Sinter | Cip pure Titanium | 3.2g/cc | 51184 | 45000 | 27739 |
| CP-Ti Sinter | Cast Pure Titanium | 2 | 6216 | NA | 5321 |
| Ti 6242 sinter | Cast Ti 6242 | 2.088 | 11842 | NA | 9823 |

| | | | | | Comp strength @ 300C° PSI |
|---|---|---|---|---|---|
| AZM1 | Al Mg alloy | 1.2 | 500 | 500 | NA |
| AZM2 | Al Mg Zn alloy | 1.1 | 1000 | 1000 | NA |
| 2024 ScomP C4 | 2024 Aluminum | 2.1 | 12000 | 7000-13000 | 6000 |
| 7075 ScomP C4 | 7075 Aluminum | 1.8 | 15000 | 10000-15000 | 12000 |
| 6061 ScomP C4 | 6061 Aluminum | 2.0 | 6000 | 6000-10000 | 2250 |
| CP Aluminum ScomP C4 | Pure Aluminum | 2.0 | 5000 | 5000 | 2180 |
| C103 SComP | C103 Nb alloy | NA | NA | NA | NA |
| Nb SComP | Niobium Cb752 | NA | NA | NA | NA |

FIG. 8

Table 2 - Room Temperature Modulus

| Material | Alloy | Density g/cc | Compressive modulus RT MSI |
|---|---|---|---|
| CP-Ti Cip Sinter | Pure Titanium | 3.2 | 9.59 |
| CP-Ti Cast Sinter | Pure Titanium | 2 | 1.91 |
| Ti 64 Cast sinter | Ti 64 | 2.088 | 13.19 |
| AZM1 | Al Mg alloy | 1.2 | 0.01 |
| AZM2 | Al Mg Zn alloy | 1.1 | 0.01 |
| 2024 ScomP C4 | 2024 Aluminum | 2.1 | 0.12 |
| 7075 ScomP C4 | 7075 Aluminum | 1.8 | 0.07 |
| 6061 ScomP C4 | 6061 Aluminum | 2 | 0.15 |
| CP Aluminum ScomP C4 | Pure Aluminum | 2 | 0.02 |
| C103 SComP | C103 Nb alloy | | NA |
| Nb SComP | Niobium alloy | | NA |

FIG. 9

Table 3 Flexure Properties

| Material | Alloy | Density | flexure strength PSI | Flexure Modulus MSI |
|---|---|---|---|---|
| | | g/cc | psi | Msi |
| CP-Ti Cip Sinter | pure Titanium | 3.2g/cc | | |
| CP-Ti Cast Sinter | Pure Titanium | 2 | 2143 | 3.65 |
| Ti 6242 Cast sinter | Ti 6242 | 2.088 | 1517 | 2.41 |
| | | Density | | |
| AZM1 | Al Mg alloy | 1.2 | NA | NA |
| AZM2 | Al Mg Zn alloy | 1.1 | NA | NA |
| 2024 ScomP C4 | 2024 Aluminum | 2.1 | 17600 | 1.98 |
| 7075 ScomP C4 | 7075 Aluminum | 1.8 | 15500 | 1.99 |
| 6061 ScomP C4 | 6061 Aluminum | 2 | 16200 | 0.68 |
| CP Aluminum ScomP C4 | Pure Aluminum | 2 | NA | NA |
| C103 SComP | C103 Nb alloy | | NA | NA |
| Nb SComP | Niobium CB752 alloy | | NA | NA |

FIG. 10

Table 4 Thermal Property Overview

| Material | Alloy | Density | Thermal Conductivity RT | Thermal Expansion 0-500C |
|---|---|---|---|---|
| | | g/cc | w/mK | m/m*10^6 |
| CP-Ti Cip Sinter | pure Titanium | 3.2g/cc | 4.07 | 11.7 |
| CP-Ti Cast Sinter | Pure Titanium | 2 | 1.61 | 11.4 |
| Ti 64 Cast sinter | Ti 64 | 2.088 | 2.02 | 12.1 |
| | | Density | | Thermal Expansion 0-300C |
| AZM1 | Al Mg alloy | 1.2 | 43 | 24.6 |
| AZM2 | Al Mg Zn alloy | 1.1 | 48 | NA |
| 2024 ScomP C4 | 2024 Aluminum | 2.1 | 85 | NA |
| 7075 ScomP C4 | 7075 Aluminum | 1.8 | NA | NA |
| 6061 ScomP C4 | 6061 Aluminum | 2 | 80 | 23.1 |
| CP Aluminum ScomP C4 | Pure Aluminum | 2 | 75 | 22.7 |
| C103 SComP | C103 Nb alloy | | NA | NA |
| Nb SComP | Niobium alloy | | NA | NA |

FIG. 11

LOW THERMAL STRESS METAL STRUCTURES

The present invention claims priority on U.S. Provisional Patent Application Ser. No. 62/549,704 filed Aug. 24, 2017, which is incorporated herein by reference. This application is also a continuation-in-part of U.S. Ser. No. 14/752,166 filed Jun. 26, 2015, which in turn claims priority on U.S. Ser. No. 13/445,810 filed Apr. 12, 2012, now U.S. Pat. No. 9,096,034 (issued Aug. 4, 2015) which in turn claims the benefit of U.S. Provisional Application Ser. No. 61/474,712 filed Apr. 12, 2011.

STATEMENT REGARDING FEDERALLY SPONSORED RESEARCH OR DEVELOPMENT

Portions of this invention were developed and reduced to practice with the assistance of federal funds, under which the US government has certain government purpose rights. Federal assistance was received under NASA Contract NNX15CC63P, and DARPA contract W31P4Q18C0007.

TECHNICAL FIELD OF THE INVENTION

The invention pertains to the design and materials of construction of structures in which thermal or other strain-induced loads, such as constrained thermal growth and thermal gradient loads, contribute a large portion of the stresses. In particular, the present invention pertains to a structured three-phase composite which include a metal phase, a ceramic phase and a gas phase that are arranged to create low thermal conductivity, have controlled stiffness, and a coefficient of thermal expansion (CTE) to reduce thermal stresses in the structure when exposed to cyclic thermal loads. The structured three-phase composite is useful for use in structures such as, but not limited to, heat shields, cryotanks, high speed engine ducts, exhaust-impinged structures, and high speed and reentry aeroshells.

BACKGROUND OF THE INVENTION

Numerous structures with great technological importance are subjected to large temperature changes during use. Highly recognizable applications include thermal energy storage systems (such as molten salt storage), hypersonic vehicles, reentry vehicles, turbine and other high speed engine systems, cyrogenic fluid storage systems, automobile exhaust systems, combustion systems, and nuclear energy systems, among others. These large temperature swings or gradients in such applications which occur on start-up, operation, or use, impose severe design constraints in addition to environmental concerns such as corrosion or oxidation.

Some design techniques for managing these conditions include:

Insulated hot structure—Structural loads are taken by a high temperature, normally exotic materials system. The thermal insulation is added external to the load-bearing structure. In addition to the need for expensive high temperature materials, large thermal strains (from fabrication to use) must be accommodated.

Insulated cold structure—The structure is fabricated from common construction materials and lined with an insulating material such as firebrick. For large structures, this has proven more economic, but comes with the problem of failures and thermal growth of the inner insulating layers. This type of structure is also expensive to fabricate.

Use of heat sinks or active thermal management—When the heat load is non-continuous or a when weight is not critical (such as in vehicles), a large thermal mass, or thermal energy management system can be used. A thermal sink accumulates energy in a large heat capacity material, such as iron or phase change material. An active thermal system removes heat and transports it to a radiator or other heat rejection device. Active cooling is costly, normally heavy and, because it has many moving parts and fluids, is subject to reliability and maintenance issues.

Current metallic thermal protection system (TPS) concepts use a foil-gauge, superalloy honeycomb sandwich to form a hot outer surface. Two different configurations have been previously pursued. The first is a superalloy honeycomb sandwich (SA/HC) 10 formed of lightweight fibrous insulation 12 encapsulated between two honeycomb sandwich panels 14. (See FIG. 1). The sandwich panels are designed to be directly mechanically attached to a smooth, continuous substructure. Each panel is vented to local pressure, such that aerodynamic pressure loads are carried by the substructure rather than by the outer honeycomb sandwich of the TPS. The outer surface 20 is comprised of a foil-gauge Inconel® 617 honeycomb sandwich and the inner surface is a titanium honeycomb sandwich, with part of one facesheet and core removed to save weight. Fasteners 16 are used to secure the SA/HC to a structure S. A seal 18 can be positioned between the structure S and the SA/HC.

A second system reported and under development by BF Goodrich® (Rohr, Inc.) is illustrated in FIG. 2, using similar materials and fabrication techniques. The X-33 metallic TPS panel 20 is used to form an aeroshell designed to carry the aerodynamic pressure on the outer surface. Each TPS panel includes a superalloy honeycomb sandwich heat shield 22 with foil-encapsulated fibrous insulation 24 attached to the inner side. Each square panel is mechanically attached to a metallic, stand-off bracket (rosette) 26 at each corner, and has foil extensions 28 that overlap and seal between the panels. The brackets are used to secure the panel to external cryotank stiffeners 29. Because the TPS is designed to support the aerodynamic pressure on the outer hot surface, the panel-to-panel seals must carry the aerodynamic pressures and prevent hot gas ingress between adjacent panels to avoid damage to the underlying structure. The foil-gauge, panel-to-panel seals must carry significant aerodynamic pressure at elevated temperature without significant leakage or other failure (i.e., flutter) under a variety of loadings for the life of the TPS. Gaps between the panels and around the stand-off brackets allow direct radiation from the hot outer surface into the protected vehicle substructure.

In a similar manner, current thermal energy storage tanks that store molten metal slats are fabricated using a rigid steel tank construction lined with refractory brick. The system is very costly, and relies on the molten salt solidifying between the bricks to prevent corrosion and attack of the steel structure. Even so, severe stresses occur upon cyclic operation, and lifetimes and maintenance costs dramatically increase costs. To reduce concentrating solar power energy costs, higher temperature chloride salt systems are needed, which compound the structural problems while being more corrosive against both refractories and common structural materials.

In view of the current state of technology, there remains a need for an improved system to accommodate large temperature swings or gradients in various types of applications.

SUMMARY OF THE INVENTION

The present invention pertains to the design of and materials of construction of structures in which thermal or other strain-induced loads, such as constrained thermal growth and thermal gradient loads, contribute a large portion of the stresses to the structure. In particular, the present invention pertains to a structured three-phase composite which include a metal phase, a ceramic phase, and a gas phase that are specifically arranged to create low thermal conductivity, and also have controlled stiffness and a CTE to reduce thermal stresses in the structure when exposed to cyclic thermal loads. The structured three-phase composite is useful for use in structures such as, but not limited to, heat shields, cryotanks, high speed engine ducts, exhaust-impinged structures, and high speed and reentry aeroshells.

The ceramic forms about 5-35 vol. % (and all values and ranges therebetween) of the composite. The gas phase constitutes about 10-40 vol. % (and all values and ranges therebetween) of the composite. The metallic phase forms about 1-20 vol. % (and all values and ranges therebetween) of the composite. The composite can include additional phases including gas porosity or ceramic or intermetallic phases. Useful structures generally have about 25-65 vol. % microballoons (and all values and ranges therebetween), generally dispersed in the metal matrix to have contiguities less than 0.1 vol. %, typically less than 0.05 vol. %, and more typically less than 0.01 vol. %. The total porosity of the composite, including primary (microballoon or microsphere) and secondary (in the metallic matrix) is 20-70 vol. % (and all values and ranges therebetween). The gas spaces in the composite are generally filled with argon, nitrogen or other inert gas, but may be in vacuum, depending on sintering conditions. A vacuum or a low thermal conductivity gas (e.g., argon, nitrogen, etc.) are typically used. Helium or other high thermal conductivity gases are typically not used.

The microballoons or microspheres in the composite are generally formed of ceramic, but may also or alternatively be formed of an intermetallic or metalloid material. The size of the microballoons or microspheres is generally 10-200 microns in diameter or maximum cross-sectional length (and all values and ranges therebetween), and typically 30-100 microns in diameter or maximum cross-sectional length. The microballoons or microspheres can be fabricated from a material with a melting or softening point above 1000° C., and typically above 1400° C. To facilitate fabrication of the microballoons or microspheres, the microballoons or microspheres crush strengths are generally above 2000 psig, typically above 4000 psig, and more typically above 5000 psig to enable isostatic or axial pressing of the composite.

The microballoons or microspheres in the composite can be fabricated from insulating ceramics such as, but not limited to, $Si_3N_4$, SiAlON, alumina, mullite and other aluminosilicates, glassy carbon, zirconia, and other high temperature low thermal conductivity ceramics.

The microballoons or microspheres in the composite generally have a wall thicknesses of 10-30% of the microballoon or microsphere diameter. It can be appreciated that for less weight sensitive applications, sintered, porous, insulating ceramic microballoons or microspheres may be used. For very high strength sintered porous ceramic microballoons or microspheres, which can have strengths above 20,000 psig, and typically above 50,000 to 60,000 spig, these microballoons or microspheres can facilitate in post fabrication deformation processing of the composite at temperatures well below the solidus of the metal binder in the composite. Near fully dense (>90 or 95% density) ceramic walls can be used on the microballoons or microspheres; however, highly porous sintered microbeads can also be used as well.

The metallic matrix in the composite may optionally have additional ceramic phases, such as oxide content, oxide, nitride, silicide, or other inorganic nanoparticles or intermetallics. Such additional phases can constitute about 0.01-10 vol. % of the composite. These additional ceramic phases can be included to further reduce matrix thermal conductivity in the composite. The formation of these additional ceramic phases can be derived by controlling the particle size of the starting metal powders to control native oxide content, by adding a reactive material or dispersing oxides or other intermetallics from native or added phases, and/or by adding controlled amounts of nitrogen, oxygen, or other reactive gas during the material processing (normally during the sintering) step. These additional ceramic phases may also be developed by heat treatment, by preferential segregation to the grain boundaries, and/or derived from blended elemental additions and formed during the consolidation processing. The additional ceramic phases addition to the metallic matrix can be used to refine the grain structure, reduce the conductivity at interfaces (grain boundary), and/or therefore reduce the thermal conductivity to the desired or lowest level.

The composite can have low contiguity (touching of ceramic phases) and high toughness and resilience at higher than about 20 vol. % microballoons or microspheres content. For such composites, advanced processing techniques are typically used. These techniques include agglomeration, in which the metal and ceramic microballoons or microspheres phases are preblended. Methods include granulation, precompaction, powder coating, glatt or wurster bed coating, liquid-solid blending. By adding some or all of the metallic matrix onto fluidized or suspended microballoons or microspheres, the desired low contiguity can be achieved. The production of well dispersed microballoons or microspheres is facilitated by the use of fine metal powders, generally less than 20% of the diameter of the average microballoon or microsphere size, and typically less than 10% of the diameter of the average microballoon or microsphere size. Another technique is to utilize a fraction of metal powders that are larger than the microballoons or microspheres, along with a fine fraction to fill the voids. Typically, metal powders are selected in the 1-20 micron particle size, although concentrations of larger (such as atomized) powders up to 100-200 microns may be added. A particle size dispersion, often multimodal with at least 20% fines (less than $1/10^{th}$ to $1/20^{th}$ the microballoon or microsphere average size), and 15-20% coarser (e.g., $1/5^{th}$ to $1/7^{th}$ the microballoon or microsphere size) can be used.

Adding shear during processing to the composite can also facilitate in good dispersions, and shearing processes such as extrusion and roll compaction along with the use of binders and lubricants can be used to create low contiguity compacts.

A technique also helpful in preparing high strength low contiguity syntactics is the addition of a metal or active coating to the microballoon or microsphere through such techniques as electroplating, electroless plating, chemical or physical vapor deposition, or other coating technique. Particularly useful are coatings of low melting braze or self-fluxing alloys (nickel-phosphorus, nickel-boron), or low melting metals or eutectic formers (e.g., aluminum, magnesium, zinc, copper, silicon). The added metal, when used, is typically a desired alloying element, or highly soluble in the selected metal matrix alloy system. This coating technique has the advantage of strengthening the microballoons or microspheres, and ensuring the microballoons or microspheres are gas-tight and/or low/zero contiguity while enhancing the sintering or consolidation cycle time. Precoating thickness on the microballoons or microspheres is typically 0.5-5 micron thick, or 2-20 wt. % of the total metal content. For improved properties and processing, a eutectic or low melting content of 3-15 vol. %, and typically 4-8 vol. % of the total volume is formed upon heating of the metal-balloon-coating system.

Processing conditions of the composite are selected to limit the damage to the microballoons or microspheres so that less than 20% of the microballoons or microspheres are crushed or deformed during processing, typically less than 10% of the microballoons or microspheres are crushed or deformed during processing, and more typically less than 5% of the microballoons or microspheres are crushed or deformed during processing. Crushing or deformation of the microballoons or microspheres can be limited by fabrication through such techniques as limiting compaction pressure, coating the microballoons or microspheres so as to strengthen them, and/or precrushing microballoons or microspheres to remove weak microballoons or microspheres. The use of microporous ceramic microbeads can also be used for less weight sensitive applications.

The resultant composite generally has a thermal conductivity of at least 40% less than the parent metallic alloy, and typically at least less than 80%. In many systems, with proper design, a 90-95% reduction in thermal conductivity is achieved in the composite by combining grain refinement, microballoon or microsphere addition, and secondary ceramic (such as oxide) inclusion content.

In addition to reduced thermal conductivity, a flexural or compressive modulus reduction of at least 40%, and typically 60-90% is obtained to minimize thermal distortion and enhance thermomechanical performance. Typical modulus reductions of 60-80% are realized in the useful ranges of microballoon or microsphere content, while lesser reduction can be achieved using porous microbeads, generally in the 30-50%. The porous microbeads have a greater impact on CTE reduction which can offset the reduced modulus reduction, and a CTE reduction of at least 20%, and typically 40-60% is combined with the reduced stiffness for the microbead additions to create the low thermal stress needed for thermally-cycled structures.

In addition to reduced thermal conductivity and modulus (or modulus and CTE), a lesser reduction in mechanical properties can be obtained to enhance thermal performance. Specifically, the reduction in compressive strength can be less than the reduction in modulus/stiffness.

Overall densities of the composite can be as low as possible while providing the required mechanical properties. In general, a 20-50% reduction in density is generally obtained, and typically a 25-40% reduction is obtained. Greater reductions are possible for higher density materials, while the addition of secondary porosity and low density fillers can be used to enhance density reduction. At certain microballoon or microsphere or microbead contents of 30-50 vol. %, density reductions of 25-45% are readily achieved while retaining the high compressive strengths needed for most applications. Using multimodal sizes of balloons (adding additional microballoons 6-10× smaller or larger than the main balloons), or addition of lightweight microfillers, fugitive additions, and/or densities can be reduced by as much as 60-65% of the parent metal or metal alloy.

The structured three-phase composite has reduced stiffness, reduced thermal conductivity, and a CTE for use in thermally-loaded structures. The structured three-phase composite configuration, enabled by a new engineered metal-ceramic-gas three-phase composite, combines the hot and cold structure techniques into an insulating structure.

The present invention is useful in monocoque structures, box and beam airframes, and thermally-loaded structure/tank and duct structures by forming structures that can manage thermal stresses, while reducing parasitic insulation requirements. The present invention is based on the ability to manufacture a structured three-phase composite in the form of a gas-ceramic-metal composite with properties that are tailorable by design. The structured three-phase composite exhibits a dramatic reduction in modulus and thermal conductivity and a modest reduction in thermal expansion, while retaining good strength, toughness, and ductility of the engineering metals. The reduction in modulus, combined with controlled CTE and lower thermal conductivity, allow stress states to be controlled and minimized at attachment/dissimilar materials integration points, while providing highly efficient insulation and structural properties of honeycomb, skin-stringer, and isogrid panels used in monocoque construction. Non-limiting properties of engineered structured three-phase composites in accordance with the present invention and the ability to be used with load bearing TPS structures are as follows:

The structured three-phase composite exhibits (as compared to conventional metals):
  reduced CTE,
  reduced thermal conductivity,
  reduced modulus,
  reduced density, and
  improved damage tolerance and impact resistance;
In hot structure (load-bearing) applications, these properties of the structure of the present invention lead to:
  reduced mean free (average) structure temperature,
  improved specific stiffness and buckling strength,
  reduced thermal stresses,
  >50% reduction in thermomechanical stresses,
  reduced system density/mass,
  ease of integration (insulating structural standoffs), and
  ease of assembly and fabrication (formable, threadable, braze/weldable, etc.).

The multifunctional, load-bearing structured three-phase composite combines the best features of metallic and ceramic hot structure systems in an integrated, structurally efficient package that minimizes the need for parasitic thermal protection and insulation systems. The use of the structured three-phase composite of the present invention enables a low-cost, scalable design and the ability to manufacture computationally-engineered, multifunctional (syntactic composite) material isogrid/skin-stringer hot structure systems for thermal system structures to dramatically reduce dry weight and cost of future hypersonic systems, molten salt and thermal energy storage systems, exhaust impinged airframe structures (including turbine blade containment systems), cryotanks (including skirts and feedthrough components), and other hot structures.

The structured three-phase composite of the present invention utilizes a thermally-insulating syntactic metal composite alloy having spherical porosity surrounded by a low CTE ceramic phase, dispersed in a metal alloy or metal matrix composite. The structured three-phase composite is formulated to resolve constrained thermal growth stresses, reduce parasitic mass, and resolve problems associated with hot structures that can carry large thermal gradients. The structured three-phase composite of the present invention is also formulated to provide significant insulation value, but which is easily assembled and attached to other structures.

The ordered arrangement of ceramic, gas, and metal in the structured three-phase composite combines the thermal properties of refractory ceramics with the mechanical properties and fabric ability of metals, such as ductility and ease of attachment to other structures and materials. The structured three-phase composite is weldable, brazeable, and boltable. Due to the unique composite structure of the structured three-phase composite, the structured three-phase composite has reduced thermal conductivity, reduced thermal expansion, reduced density, and reduced modulus as compared to pure metals, thereby providing tremendous resistance to thermally-induced buckling that can be encountered in high temperature, structurally-demanding environments.

Due to these attributes, the structured three-phase composite of the present invention negates or reduces the problems typically found with the creation of thermally-stressed structures such as hypersonic vehicles, engines, and thermal energy storage systems. Furthermore, the structured three-phase composite can be fabricated from a range of metals, including magnesium and aluminum alloys for low temperature (below 10° C.) and cryogenic (below −150° C.) applications, titanium, iron, and nickel-based alloys for temperatures of 650-1100° C., and niobium, molybdenum, and other refractory metal alloys for temperatures of 1200-1700° C.+.

During the design and fabrication of high temperature structures, a designer has a choice between 1) cost prohibitive exotic material hot structures often using unreliable and costly ceramic composites, and 2) complex insulated cold structures (which are both difficult to assemble and seal). By utilizing engineered structured three-phase composites of the present invention as a structural insulator in lined or insulated systems, these past difficulties can be overcome, along with reducing the parasitic weight associated with traditional systems. In the case of molten salt thermal storage systems, the use of the engineered structured three-phase composite of the present invention can reduce assembly and sealing costs and extend the life of the system as compared to refractory lined vessels. The engineered structured three-phase composite of the present invention also can be used to reduce insulation needs for hot structures.

In applications ranging from hypersonic vehicles to cryotanks, parasitic weight can also be reduced by the use of the engineered structured three-phase composite of the present invention, while also reducing or eliminating thermal stresses by up to 80% over other hot structure materials.

In summary, the present invention relates to a structured three-phase composite that can be subjected to cyclic thermal loads, and which structured three-phase composite includes a three-phase metal-ceramic-gas composite. The gas and ceramic phases of the structured three-phase composite are typically discontinuous, and the metal phase is typically continuous. The structured three-phase composite typically has a >25% lower modulus than the metal. The structured three-phase composite typically has a >40% lower thermal conductivity than the metal. The structured three-phase composite typically has a density at least 20% lower than the metal.

The metal phase of the structured three-phase composite can include one or more high temperature metals, alloys, and composites such as, but not limited to, titanium, niobium, nickel, iron, molybdenum, tantalum, hafnium, zirconium, or tungsten, including, but not limited to, the alloy systems Cb752, C103, Nb-1Zr, Ti-64, Ti6242, Ti β21s, titanium, iron, or nickel aluminides, TZM, IN909, IN718, IN625, MA956, Ni200, Haynes420, IN600, and Ta-10W.

The structured three-phase composite can be designed for use above 700-1650° C. (and all values and ranges therebetween) surface temperature.

The structured three-phase composite can be coated or surface modified for corrosion/oxidation protection, wherein the coating includes one or more materials such as iridium, platinum, rhenium, rhodium, silicides, MCrAl, MCrAlY, aluminum, and chrome-containing materials. The one or more materials can be applied to the structured three-phase composite by pack cementation, slurry fusion, VD, CVD, plasma spray, thermal spray, electroplating, or other application technique.

The structured three-phase composite can be coated with a thermal barrier coating to increase surface temperature limits by 50-250° C. The coating can be applied at a thickness of 5-20 mil (125-500 microns) (and all values and ranges therebetween), but can also be a thick thermal barrier of 0.5-2 MM in thickness.

The structured three-phase composite can be used as a load bearing airframe structure, such as a panel, aeroshell, isogrid, skin-stringer, ring, strut, bulkhead, or other airframe component.

The structured three-phase composite can be designed to reduce buckling and/or constrained thermal growth stresses by more than 30%, and typically more than 50%.

The structured three-phase composite can be used to resist atmospheric heating, such as in a hypersonic, launch, or reentry vehicle airframe, leading edge, acreage TPS, duct, flap, seal, or other structure to resist aerodynamic heating.

The structured three-phase composite can be used to resist engine and exhaust loads, including exhaust-impinged structures, nozzles or nozzle components, flaps, rings, channels, panels, cowls, and other exhaust and engine flowpath and adjacent airframe structures and components.

The structured three-phase composite can be used in molten salt storage or transfer applications, such as for a storage tank, pipe, line, valve, shield, panel, or other molten salt-contacted component or structure, where the molten salt system can include chlorides, carbonates, nitrates, bromides, sulfides, and their mixtures.

The metal phase of the structured three-phase composite can include one or more metals selected from magnesium, aluminum, vanadium, titanium and their alloys and composites, including, but not limited to, AZ, ZK, WE, ZE, WEZ, WZ, calcium-, manganese-, and zirconium-containing magnesium alloys, 2xxx, 6xxx, 7xxx, and 8xxx and aluminum-lithium aluminum alloys, Ti6242, and Ti64 alloys.

The structured three-phase composite can have a corrosion-resistant coating applied for cryogenic compatibility with $LH_2$, LOx or other cryogenic material.

The structured three-phase composite can have a corrosion-resistant coating of aluminum or an aluminum alloy. The aluminum or aluminum alloy coating can be applied by thermal spray, cold spray, friction cladding, roll-bonding, roll-cladding, brazing, or other attachment technique that creates an intimate bond, generally defined as above 5000 psig strength, and typically a metallurgical bond, with the underlying metal in the structured three-phase composite.

The structured three-phase composite can be used in cryogenic applications, including a tank, skirt, feed-through, support, ring, sweep, valve or valve body, vent, or other component periodically exposed to cryogenic temperatures.

The structured three-phase composite can include additional insulation, where such insulation can be rigid or flexible, and can include rigid polyurethane and isocyanate foams, insulation blankets, aerogel containing insulation blankets, molded refractories, etc.

The structured three-phase composite can be supported by and attached to a steel, titanium, aluminum or other low cost structural support to transfer loads to the ground, vehicle or tank internal or external airframe or adjacent airframe, or between components or panels.

The structured three-phase composite can include a panel or component intersections that have been made impermeable. The panel or component can be joined using welding processes, including arc welding, TEG welding, MIG welding, spray-welding, friction stir welding, or other metal welding technique. The panels can be mechanically attached through such techniques as rivets, bolts, retainers, clips, and other mechanical attachments.

The structured three-phase composite can include a stand-off that is placed between the three-phase structure or component and the load transfer structural system, such as to allow for additional insulation.

The structured three-phase composite has a ductility at room temperature greater than 2% strain to failure, and typically greater than 4%, and generally in the 4-20% range.

The structured three-phase composite has a ductility at cryogenic or elevated temperatures greater than 2% strain to failure, generally greater than 4% strain to failure, and typically greater than 8% strain to failure.

The structured three-phase composite can be fabricated using powder metallurgy or casting processes.

The structured three-phase composite can be subjected to a manufacturing process to form a near net shape of the final product.

The structured three-phase composite can be laminated or graded to control thermal stresses, such as by varying CTE, modulus, or thermal conductivity across the width of the panel or component.

One non-limiting object of the present invention is the provision of a structured three-phase composite which includes a metal phase, a ceramic phase, and a gas phase that are arranged to create low thermal conductivity, and also have controlled stiffness, and a CTE to reduce thermal stresses in the structure when exposed to cyclic thermal loads.

Another non-limiting object of the present invention is the provision of a structured three-phase composite that is useful for use in structures such as, but not limited to, heat shields, cryotanks, high speed engine ducts, exhaust-impinged structures, and high speed and reentry aeroshells.

Another non-limiting object of the present invention is the provision of a structured three-phase composite that has reduced stiffness, reduced thermal conductivity, and a CTE for use in thermally-loaded structures.

Another non-limiting object of the present invention is the provision of a structured three-phase composite that is useful in monocoque structures, box and beam airframes, and thermally-loaded structure/tank and duct structures by forming a structures that can manage thermal stresses while reducing parasitic insulation requirements.

Another non-limiting object of the present invention is the provision of a structured three-phase composite that exhibits a dramatic reduction in modulus and thermal conductivity and a modest reduction in thermal expansion, while retaining good strength, toughness, and ductility of the engineering metals.

Another non-limiting object of the present invention is the provision of a structured three-phase composite that allows stress states to be controlled and minimized at attachment/dissimilar materials integration points, while providing highly efficient insulation and structural properties of honeycomb, skin-stringer, and isogrid panels used in monocoque construction.

Another non-limiting object of the present invention is the provision of a structured three-phase composite that exhibits (as compared to conventional metals) reduced CTE, reduced thermal conductivity, reduced modulus, reduced density, and/or improved damage tolerance and impact resistance.

Another non-limiting object of the present invention is the provision of a structured three-phase composite that is used in hot structure (load-bearing) applications that exhibits reduced mean free (average) structure temperature, improved specific stiffness and buckling strength, reduced thermal stresses, >50% reduction in thermomechanical stresses, reduced system density/mass, ease of integration (insulating structural standoffs), and/or ease of assembly and fabrication (formable, threadable, braze/weldable, etc.).

Another non-limiting object of the present invention is the provision of a structured three-phase composite that enables a low-cost, scalable design and the ability to manufacture computationally-engineered, multifunctional (syntactic composite) material isogrid/skin-stringer hot structure systems for thermal system structures to dramatically reduce dry weight and cost of future hypersonic systems, molten salt and thermal-energy storage systems, exhaust-impinged airframe structures (including turbine blade containment systems), cryotanks (including skirts and feedthrough components), and other hot structures.

Another non-limiting object of the present invention is the provision of a structured three-phase composite that utilizes a thermally-insulating syntactic metal composite alloy having spherical porosity surrounded by a low CTE ceramic phase, dispersed in a metal alloy or metal matrix composite.

Another non-limiting object of the present invention is the provision of a structured three-phase composite that is formulated to resolve constrained thermal growth stresses, reduce parasitic mass, and resolve problems associated with hot structures that can carry large thermal gradients.

Another non-limiting object of the present invention is the provision of a structured three-phase composite that is formulated to provide significant insulation value, but which is easily assembled and attached to other structures.

Another non-limiting object of the present invention is the provision of a structured three-phase composite that is weldable, brazeable, and boltable.

Another non-limiting object of the present invention is the provision of a structured three-phase composite that has reduced thermal conductivity, reduced thermal expansion, reduced density, and reduced modulus as compared to pure metals, thereby providing tremendous resistance to thermally-induced buckling that can be encountered in high temperature, structurally-demanding environments.

Another non-limiting object of the present invention is the provision of a structured three-phase composite that negates or reduces the problems typically found with the creation of thermally-stressed structures such as hypersonic vehicles, engines, and thermal energy storage systems.

Another non-limiting object of the present invention is the provision of a structured three-phase composite that can be fabricated from a range of metals, including magnesium and aluminum alloys for low temperature (below 10° C.) and cryogenic (below −150° C.) applications, titanium, iron, and nickel-based alloys for temperatures of 650-1100° C., and niobium, molybdenum, and other refractory metal alloys for temperatures of 1200-1700° C.+.

Another non-limiting object of the present invention is the provision of a structured three-phase composite that reduces assembly and sealing costs and extends the life of the system as compared to refractory lined vessels.

Another non-limiting object of the present invention is the provision of a structured three-phase composite that can reduce insulation needs for hot structures.

Another non-limiting object of the present invention is the provision of a structured three-phase composite that can reduce parasitic weight while also reducing or eliminating thermal stresses by up to 80% over other hot structure materials.

Another non-limiting object of the present invention is the provision of a structured three-phase composite wherein the gas and ceramic phases are typically discontinuous, and the metal phase is typically continuous.

Another non-limiting object of the present invention is the provision of a structured three-phase composite that typically has a >25% lower modulus than the metal.

Another non-limiting object of the present invention is the provision of a structured three-phase composite that typically has a >40% lower thermal conductivity than the metal.

Another non-limiting object of the present invention is the provision of a structured three-phase composite that typically has a density at least 20% lower than the metal.

Another non-limiting object of the present invention is the provision of a structured three-phase composite wherein the metal phase includes one or more high temperature metals, alloys, and composites such as, but not limited to, titanium, niobium, nickel, iron, molybdenum, tantalum, hafnium, zirconium, or tungsten, including, but not limited to, the alloy systems Cb752, C103, Nb-1Zr, Ti-64, Ti6242, Ti-$\beta$21 s, titanium, iron, or nickel aluminides, TZM, IN909, IN718, IN625, MA956, Ni200, Haynes420, IN600, and Ta-10W.

Another non-limiting object of the present invention is the provision of a structured three-phase composite that is designed for use above 700-1650° C. (and all values and ranges therebetween) surface temperature.

Another non-limiting object of the present invention is the provision of a structured three-phase composite that is coated or surface modified for corrosion/oxidation protection, and wherein the coating includes one or more materials such as iridium, platinum, rhenium, rhodium, silicides, MCrAl, MCrAlY, aluminum, and chrome-containing materials.

Another non-limiting object of the present invention is the provision of a structured three-phase composite that is coated by pack cementation, slurry fusion, VD, CVD, plasma spray, thermal spray, electroplating, or other application technique.

Another non-limiting object of the present invention is the provision of a structured three-phase composite that is coated with a thermal barrier coating to increase surface temperature limits by 50-250° C.

Another non-limiting object of the present invention is the provision of a structured three-phase composite that is used as a load-bearing airframe structure, such as a panel, aeroshell, isogrid, skin-stringer, ring, strut, bulkhead, or other airframe component.

Another non-limiting object of the present invention is the provision of a structured three-phase composite that is designed to reduce buckling and/or constrained thermal growth stresses by more than 30%, and typically more than 50%.

Another non-limiting object of the present invention is the provision of a structured three-phase composite that is used to resist atmospheric heating, such as in a hypersonic, launch, or reentry vehicle airframe, leading edge, acreage TPS, duct, flap, seal, or other structure to resist aerodynamic heating.

Another non-limiting object of the present invention is the provision of a structured three-phase composite that is used to resist engine and exhaust loads, including exhaust-impinged structures, nozzles or nozzle components, flaps, rings, channels, panels, cowls, and other exhaust and engine flowpath and adjacent airframe structures and components.

Another non-limiting object of the present invention is the provision of a structured three-phase composite that is used in molten salt storage or transfer applications, such as for a storage tank, pipe, line, valve, shield, panel, or other molten salt-contacted component or structure, where the molten salt system can include chlorides, carbonates, nitrates, bromides, sulfides, and their mixtures.

Another non-limiting object of the present invention is the provision of a structured three-phase composite wherein the metal phase includes one or more metals selected from magnesium, aluminum, vanadium, titanium and their alloys and composites, including, but not limited to, AZ, ZK, WE, ZE, WEZ, WZ, calcium-, manganese-, and zirconium-containing magnesium alloys, 2xxx, 6xxx, 7xxx, and 8xxx and aluminum-lithium aluminum alloys, Ti6242, and Ti64 alloys.

Another non-limiting object of the present invention is the provision of a structured three-phase composite wherein the composite has a corrosion-resistant coating applied for cryogenic compatibility with $LH_2$, LOx or other cryogenic material.

Another non-limiting object of the present invention is the provision of a structured three-phase composite that includes a corrosion-resistant coating that can be applied by thermal spray, cold spray, friction cladding, roll-bonding, roll-cladding, brazing, or other attachment technique that creates an intimate bond, generally defined as above 5000 psig strength, and typically a metallurgical bond, with the underlying metal in the structured three-phase composite.

Another non-limiting object of the present invention is the provision of a structured three-phase composite that can be used in a cryogenic applications, including a tank, skirt, feed-through, support, ring, sweep, valve or valve body, vent, or other component periodically exposed to cryogenic temperatures.

Another non-limiting object of the present invention is the provision of a structured three-phase composite that can include additional insulation, where such insulation can be rigid or flexible, and can include rigid polyurethane and isocyanate foams, insulation blankets, aerogel containing insulation blankets, molded refractories, etc.

Another non-limiting object of the present invention is the provision of a structured three-phase composite that can be supported by and attached to a steel, titanium, aluminum or other low cost structural support to transfer loads to the ground, vehicle or tank internal or external airframe or adjacent airframe or between components or panels.

Another non-limiting object of the present invention is the provision of a structured three-phase composite that has a ductility at room temperature greater than 2% strain to failure, and typically greater than 4%, and generally in the 4-20% range.

Another non-limiting object of the present invention is the provision of a structured three-phase composite that has a ductility at cryogenic or elevated temperatures greater than 2% strain to failure, generally greater than 4% strain to failure, and typically greater than 8% strain to failure.

Another non-limiting object of the present invention is the provision of a structured three-phase composite that can be fabricated using powder metallurgy or casting processes.

Another non-limiting object of the present invention is the provision of a structured three-phase composite that can be laminated or graded to control thermal stresses, such as by varying CTE, modulus, or thermal conductivity across the width of the panel or component.

Another non-limiting object of the present invention is the provision of a structured three-phase composite comprising a ceramic phase, a gas phase and a metal phase, said gas and ceramic phases are discontinuous in said composite, said metal phase is continuous phase in said composite, said composite having a modulas that is at least 25% less than a modulas of said metal forming said metal phase, said composite having a thermal conductivity that is at least 40% less than a thermal conductivity of said metal that forms said metal phase, said composite having a density that is at least 20% lower than a density of said metal that forms said metal phase.

Another non-limiting object of the present invention is the provision of a structured three-phase composite wherein a plurality of said ceramic phases are formed of ceramic particles that include a cavity that is filled with a portion of said gas phase.

Another non-limiting object of the present invention is the provision of a structured three-phase composite wherein said ceramic phase is formed of one or more materials selected from the group consisting of C, SiAlON, $Si_3N_4$, SiC, SiOC, $SiO_2$, $Al_2O_3$, and $ZrO_2$.

Another non-limiting object of the present invention is the provision of a structured three-phase composite wherein said gas phase includes one or more gasses selected from the group consisting of air, noble gasses, and nitrogen, or alternatively a vacuum.

Another non-limiting object of the present invention is the provision of a structured three-phase composite wherein said metal phase includes one or more metals selected from the group consisting of titanium, niobium, nickel, iron, molybdenum, tantalum, hafnium, zirconium, tungsten and alloys that includes such metals.

Another non-limiting object of the present invention is the provision of a structured three-phase composite wherein the ceramic forms 5-35 vol. % of said composite.

Another non-limiting object of the present invention is the provision of a structured three-phase composite wherein the gas phase constitutes 10-40 vol. % of said composite.

Another non-limiting object of the present invention is the provision of a structured three-phase composite wherein the metallic phase also incorporates 1-20 vol. % additional phases including gas porosity or ceramic or intermetallic phases.

Another non-limiting object of the present invention is the provision of a structured three-phase composite wherein at least a portion of said ceramic material of said ceramic phase is coated with a metal material prior to formation of said composite.

Another non-limiting object of the present invention is the provision of a structured three-phase composite wherein said composite is designed for use above a surface temperature of 700° C.

Another non-limiting object of the present invention is the provision of a structured three-phase composite wherein said composite is designed for use above a surface temperature of 1000° C.

Another non-limiting object of the present invention is the provision of a structured three-phase composite wherein said composite is designed for use above a surface temperature of 1200° C.

Another non-limiting object of the present invention is the provision of a structured three-phase composite wherein said composite is designed for use above a surface temperature of 1500° C.

Another non-limiting object of the present invention is the provision of a structured three-phase composite wherein said composite is designed for use above a surface temperature of 1650° C.

Another non-limiting object of the present invention is the provision of a structured three-phase composite including a coating or surface modification on an outer surface of said composite to improve corrosion/oxidation protection of said composite, said coating includes one or more materials selected from the group of iridium, platinum, rhenium, rhodium, silicides, MCrAl, MCrAlY, aluminum, aluminum alloy, and chrome-containing materials.

Another non-limiting object of the present invention is the provision of a structured three-phase composite wherein said coating or surface modification is applied by pack cementation, slurry fusion, VD, CVD, plasma spray, thermal spray, cold spray, friction cladding, roll-bonding, roll-cladding, brazing, electroplating, or other application technique.

Another non-limiting object of the present invention is the provision of a structured three-phase composite wherein said coating is applied by a process that creates a bond between said coating and said outer surface of said composite that is at least 5000 psig strength, and typically by a coating process that forms a metallurgical bond between said coating and said composite.

Another non-limiting object of the present invention is the provision of a structured three-phase composite that includes a coating or surface modification on an outer surface of said composite to increase surface temperature limits of said composite by at least about 50-250° C.

Another non-limiting object of the present invention is the provision of a structured three-phase composite wherein said composite is used as a load-bearing airframe structure such as, but not limited to, a panel, aeroshell, isogrid, skin-stringer, ring, strut, bulkhead, or other airframe component.

Another non-limiting object of the present invention is the provision of a structured three-phase composite wherein said composite is designed to reduce buckling and/or constrained thermal growth stresses by more than about 30%, and typically more than about 50%.

Another non-limiting object of the present invention is the provision of a structured three-phase composite wherein said composite is designed to resist atmospheric heating in such as, but not limited to, a hypersonic, launch, reentry vehicle airframe, leading edge, acreage TPS, duct, flap, seal, or other structure to resist aerodynamic heating.

Another non-limiting object of the present invention is the provision of a structured three-phase composite wherein said composite is designed to resist engine and exhaust loads such as, but not limited to, exhaust-impinged structures, nozzles or nozzle components, flaps, rings, channels, panels, cowls, and other exhaust and engine flowpath and adjacent airframe structures and components.

Another non-limiting object of the present invention is the provision of a structured three-phase composite wherein said composite is designed for use in molten salt storage or transfer applications such as, but not limited to, a storage tank, pipe, line, valve, shield, panel, or other molten salt contacted component or structure.

Another non-limiting object of the present invention is the provision of a structured three-phase composite wherein said molten salt system can include one or more of chlorides, carbonates, nitrates, bromides, sulfides, and their mixtures.

Another non-limiting object of the present invention is the provision of a structured three-phase composite wherein said metal phase includes one or more metals selected from magnesium, aluminum, vanadium, titanium and their alloys and composites, including AZ, ZK, WE, ZE, WEZ, WZ, calcium-, manganese-, and zirconium-containing magnesium alloys, 2xxx, 6xxx, 7xxx, and 8xxx and aluminum-lithium aluminum alloys, Ti6242, and Ti64 alloys.

Another non-limiting object of the present invention is the provision of a structured three-phase composite wherein said composite includes a corrosion-resistant coating for cryogenic compatibility with $LH_2$, LOx, or other cryogenic material.

Another non-limiting object of the present invention is the provision of a structured three-phase composite wherein said composite is designed for use in cryogenic applications that include a tank, skirt, feed-through, support, ring, sweep, valve or valve body, vent, or other component periodically exposed to cryogenic temperatures.

Another non-limiting object of the present invention is the provision of a structured three-phase composite wherein an outer surface of said composite incudes insulation, and wherein such insulation can be rigid or flexible.

Another non-limiting object of the present invention is the provision of a structured three-phase composite wherein said insulation includes one or more materials selected from the group consisting of rigid polyurethane and isocyanate foams, insulation blankets, aerogel-containing insulation blankets, molded refractories, etc.

Another non-limiting object of the present invention is the provision of a structured three-phase composite wherein said composite is designed to be supported by and attached to a steel, titanium, aluminum or other low cost structural support to transfer loads to the 1) ground, 2) vehicle or tank internal or external airframe or adjacent airframe or 3) between components or panels.

Another non-limiting object of the present invention is the provision of a structured three-phase composite wherein said composite is designed to form panel or component intersections that are impermeable.

Another non-limiting object of the present invention is the provision of a structured three-phase composite wherein said panel or component intersections are formed by panels or components that have been joined using welding processes, including arc welding, TEG welding, MIG welding, spray-welding, friction stir welding, or other metal welding technique.

Another non-limiting object of the present invention is the provision of a structured three-phase composite wherein said composite is mechanically attached to other structures by techniques such as rivets, bolts, retainers, clips, and other mechanical attachments.

Another non-limiting object of the present invention is the provision of a structured three-phase composite wherein said composite is designed to be used with a standoff that has been placed between said composite and a load transfer structural system, such as to optionally allow for additional insulation.

Another non-limiting object of the present invention is the provision of a structured three-phase composite wherein said composite has a ductility at room temperature (25° C.) that is greater than about 2% strain to failure, and typically at least about 4%, and more typically about 4-20%.

Another non-limiting object of the present invention is the provision of a structured three-phase composite wherein said composite has a ductility at cryogenic or elevated temperatures greater than about 2% strain to failure, generally greater than about 4% strain to failure, and more typically greater than about 8% strain to failure.

Another non-limiting object of the present invention is the provision of a structured three-phase composite wherein said composite is fabricated using powder metallurgy or casting processes.

Another non-limiting object of the present invention is the provision of a structured three-phase composite wherein said composite is manufactured by a process to form a near net shape.

Another non-limiting object of the present invention is the provision of a structured three-phase composite wherein said composite is laminated or graded to control thermal stresses, such as by varying CTE, modulus, or thermal conductivity across the width of the panel or component.

Another non-limiting object of the present invention is the provision of a method for forming a three-phase composite comprising: providing a ceramic material, at least a portion of said ceramic material including a cavity that includes a gas; providing a metal material; and, consolidating said ceramic material with said metal material to form said composite, and wherein said gas and ceramic phases are discontinuous in said composite, said metal phase is continuous phase in said composite, said composite having a modulas that is at least 25% less than a modulas of said metal that forms said metal phase, said composite having a thermal conductivity that is at least 40% less than a thermal conductivity of said metal that forms said metal phase, said composite having a density that is at least 20% lower than a density of said metal that forms said metal phase.

Another non-limiting object of the present invention is the provision of a method wherein at least a portion of said ceramic material is coated with a metal-coating material prior to said step of consolidating.

Another non-limiting object of the present invention is the provision of a method wherein said metal-coating material has a different composition from said metal material.

Another non-limiting object of the present invention is the provision of a method wherein said composite is coated with an outer coating material.

Another non-limiting object of the present invention is the provision of a method wherein said composite is formed into a panel.

Another non-limiting object of the present invention is the provision of a method wherein said panel is machined to form an isogrid panel.

Another non-limiting object of the present invention is the provision of a method including the step of applying an insulation material to an outer surface of said panel.

Another non-limiting object of the present invention is the provision of a method including the step of forming said composite for use as or in one or more structures selected from the group consisting of a load-bearing airframe structure, a hypersonic, launch, reentry vehicle airframe, leading edge, acreage TPS, duct, flap, seal, or other structure to resist aerodynamic heating, exhaust-impinged structures, nozzles or nozzle components, flaps, rings, channels, panels, cowls, and other exhaust and engine flowpath and adjacent airframe structures and components, a storage tank, pipe, line, valve, shield, panel, or other molten salt contacted component or structure, cryogenic applications such as a tank, skirt, feedthrough, support, ring, sweep, valve or valve body, vent, or other component periodically exposed to cryogenic temperatures.

These and other advantages of the present invention will become more apparent to those skilled in the art from a review of the description of the preferred embodiment and claims.

BRIEF DESCRIPTION OF THE DRAWINGS

FIGS. 8-11 are tables which illustrate properties of typical three-phase composite systems in accordance with the present invention.

DETAILED DESCRIPTION OF THE INVENTION

The invention pertains to the design and materials of construction of structures in which thermal or other strain-induced loads (such as constrained thermal growth and thermal gradient loads) contribute a large portion of the stresses. In particular, the present invention pertains to a structured three-phase composite which includes a metal, a ceramic, and a gas phase that are arranged to create a low thermal conductivity, have controlled stiffness, and a CTE to reduce thermal stresses in the structure when exposed to cyclic thermal loads. The structured three-phase composite is useful for use in structures such as, but not limited to, heat shields, cryotanks, high speed engine ducts, exhaust-impinged structures, and high speed and reentry aeroshells.

The structured three-phase composite has reduced stiffness, reduced thermal conductivity and a CTE for use in thermally-loaded structures. The structured three-phase composite configuration, enabled by a new engineered metal-ceramic-gas three-phase composite, combines the hot and cold structure techniques into an insulating structure.

Figure 1:
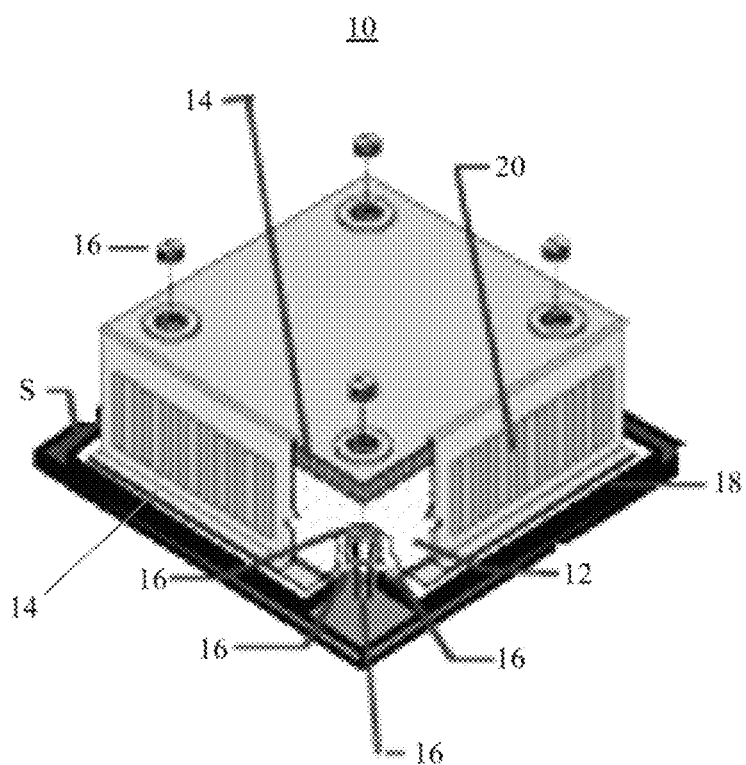
FIG. 1 illustrates a prior art NASA Metallic TPS encapsulated insulation concept.
Figure 2:
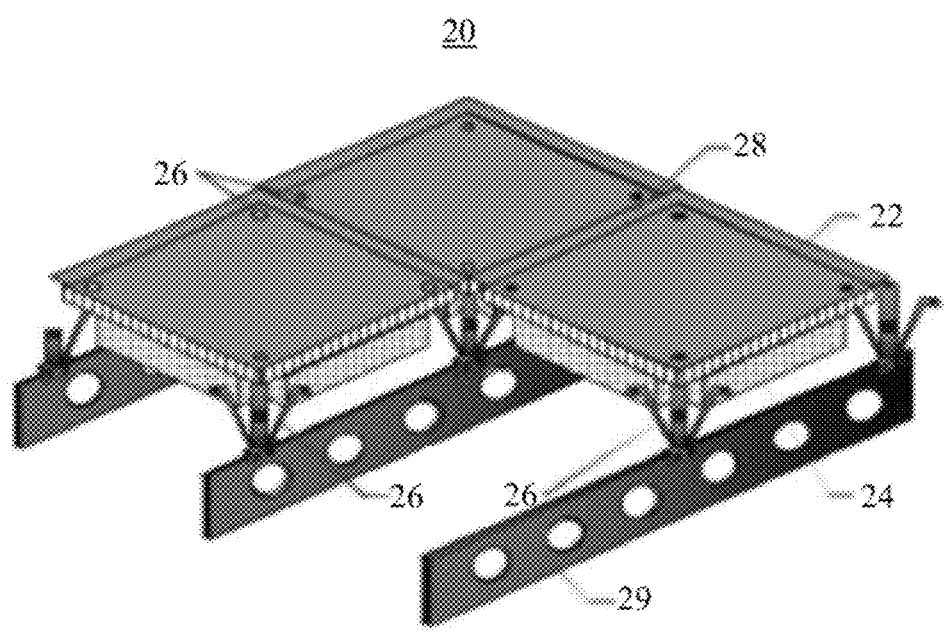
FIG. 2 illustrates a prior art BF Goodrich®/Rohr, Inc. metallic TPS System.
Figure 3:
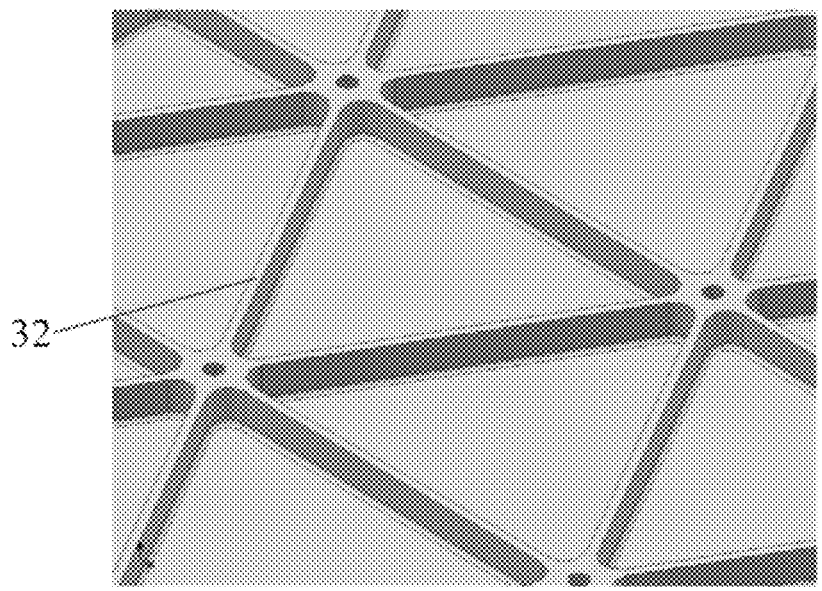
FIG. 3 illustrates low density, thermally-insulating syntactic metal composite isogrid panels in accordance with the present invention.

The present invention advances current hot structure designs and incorporates a multifunctional (thermally-insulating) structured three-phase composite, replacing the honeycomb and thermal insulation with a metal skin-stringer or isogrid-type construction. The structured three-phase composite serves as a load-bearing structural element, and can be stiffened with ribs and/or supports. The structured three-phase composite can be constructed as panels that are attached to a frame, or as an isogrid or skin-stringer or other J-stiffened panel construction or I-stiffened panel construction. These types of constructions can be used to reduce or eliminate the large costs, reliability concerns, and fabrication difficulties (e.g., complex curved panels, etc.) of the honeycomb, while still retaining a large stiffness, thermally-insulating, single-component three-phase composite. The structured three-phase composite has very low thermal conductivity (2.4 g/cc Ti 6242 structured three-phase composite has thermal conductivity equivalent to modern ceramic thermal barrier coatings) and low thermal leakage. The use of the structured three-phase composite of the present invention can result in an advantage for use in multifunctional materials. Because the materials are metallic and have low flaw sensitivity (particularly at elevated temperatures), they can be threaded, bolted, riveted, and assembled using techniques used for the last 100 years of aviation structures. FIG. 3 illustrates a non-limiting metallic isogrid design 30 in accordance with the present invention. The isogrid design is a formed of a low density, thermally-insulating syntactic metal composite that can be used to replace honeycomb panels for low cost metallic TPS and hot structure systems. The panel can include stiffening ribs 32.

In accordance with the present invention, a three-phase or syntactic metal isogrid or skin-stringer structure can be used to produce an integrated insulating structural system. This structure can also integrate the low density, high strength, but lower stiffness three-phase stiffeners/supports and facesheets with low density, extremely low thermal conductivity non-structural rigid or non-rigid insulation, such as aerogels or insulation blankets. Table 1 illustrates the compression properties of various three-phase composite systems in accordance with the present invention.

Figure 4:
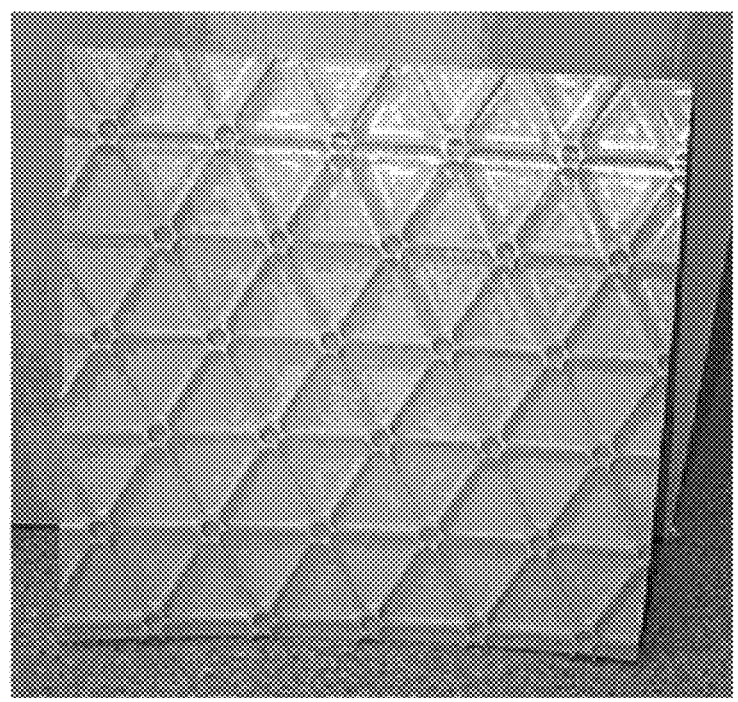
FIG. 4 illustrates an isogrid flat panel structure in accordance with the present invention.
Figure 5:
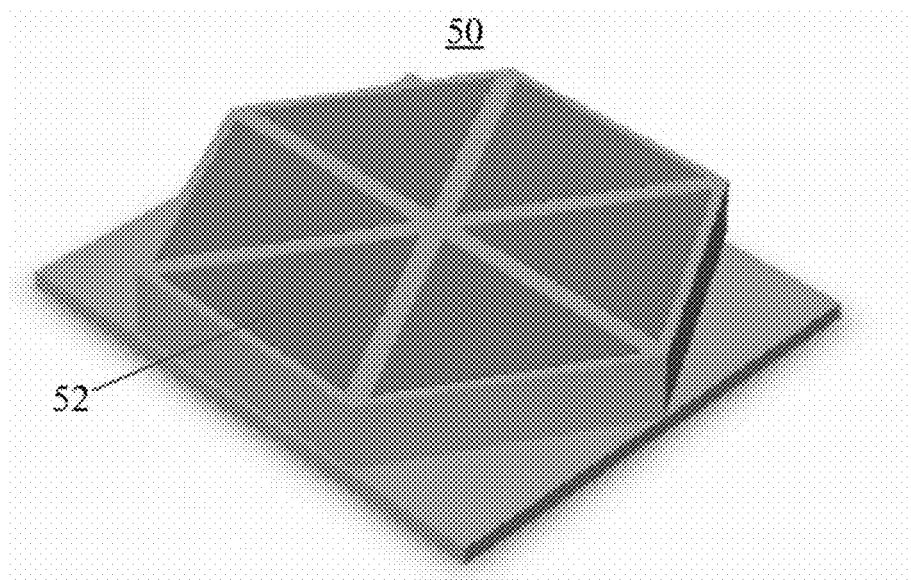
FIG. 5 illustrates an isogrid concept in accordance with the present invention incorporating a three-phase isogrid and high efficiency non-structural insulation.

An isogrid panel is a plate (or face sheet) with triangular integral stiffening ribs (often called stringers). The triangular pattern was found to be very efficient because it takes advantage of the fact that triangular trusses are very efficient structures. The term isogrid is used because the structure acts like an isotropic material. Isogrids are used in many aerospace systems where weight lightening is required with continued structural strength. Isogrid structures can be made into flat panels 40 (See FIG. 4) as well as in curved or cylindrical shapes not limiting the proposed structure to only flat area TPS. An isogrid structure can be formed that optimizes the benefits of the syntactic composite (SComP) materials allowing for the highest possible loadings with the lowest possible weight and then integrate insulation in the void space between the stiffening ribs. By controlling stiffness (modulus and width), spacing, and geometry of the grid elements while controlling CTE and thermal conductivity, the structure can be optimized for performance in its intended temperature range. Very low density insulation 52 can be added to the isogrid spaces of the isogrid panel 50 and underneath to prevent heatsoak, as illustrated in FIG. 5.

System Proposed and Modeled for High Temperature TPS

The structured three-phase composite can potentially be used for structural insulators for rocket engines, TPS systems, thermal energy storage systems, and cryotanks to reduce parasitic weight in a multilayer (ML1) high- or low-temperature system. The structured three-phase composite can act as a load bearing member, as well as a high temperature insulation primary structure. The closed-cell/impermeable nature of the structured three-phase composite can also mitigate the offgassing/condensation issues of ceramics and honeycomb structures, and the structural nature allows for ease of fabrication and integration (they can be formed, drilled, threaded, brazed, or even welded). Integrating thermal and structural functions (as well as potential impact damage mitigation) while reducing thermomechanical stresses by more than 50% can greatly reduce parasitic insulation and thermal protection system mass impacts, while enabling greatly simplified, lower cost, and more robust TPS designs to be realized.

Figure 6:
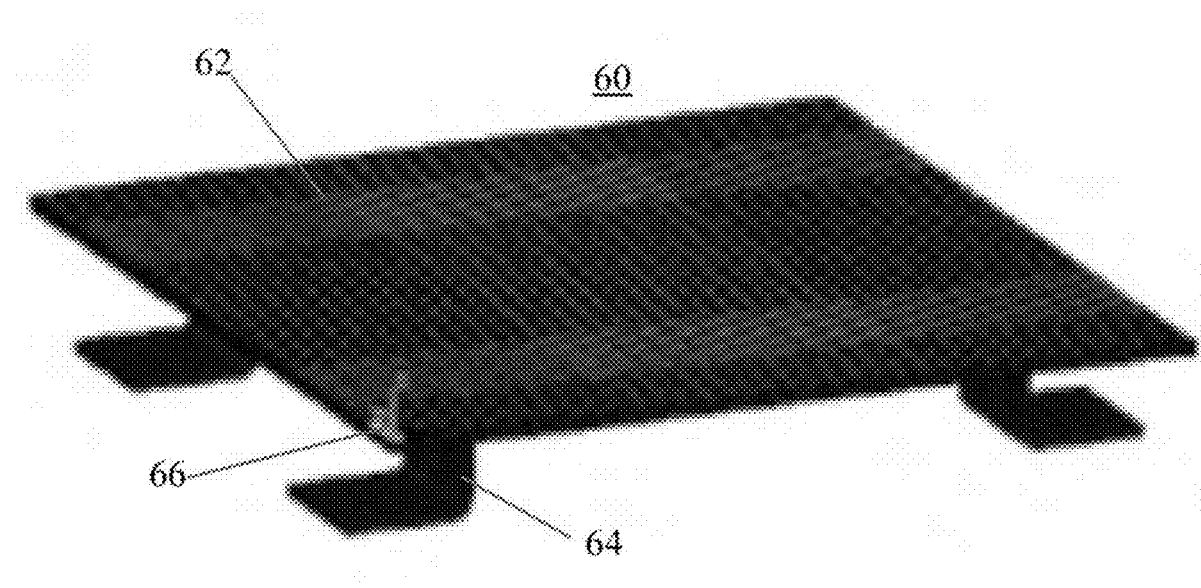
FIG. 6 illustrates MR&D-designed structural TPS using syntactic panels in a panel design.

FIG. 6 illustrates a basic integral TPS or tank panel subelement design 60, which includes a structured three-phase composite facesheet 62, standoff 64 and a structural support 66, in a 20"×20" panel design.

Three-Phase Composite Materials

Figure 7:
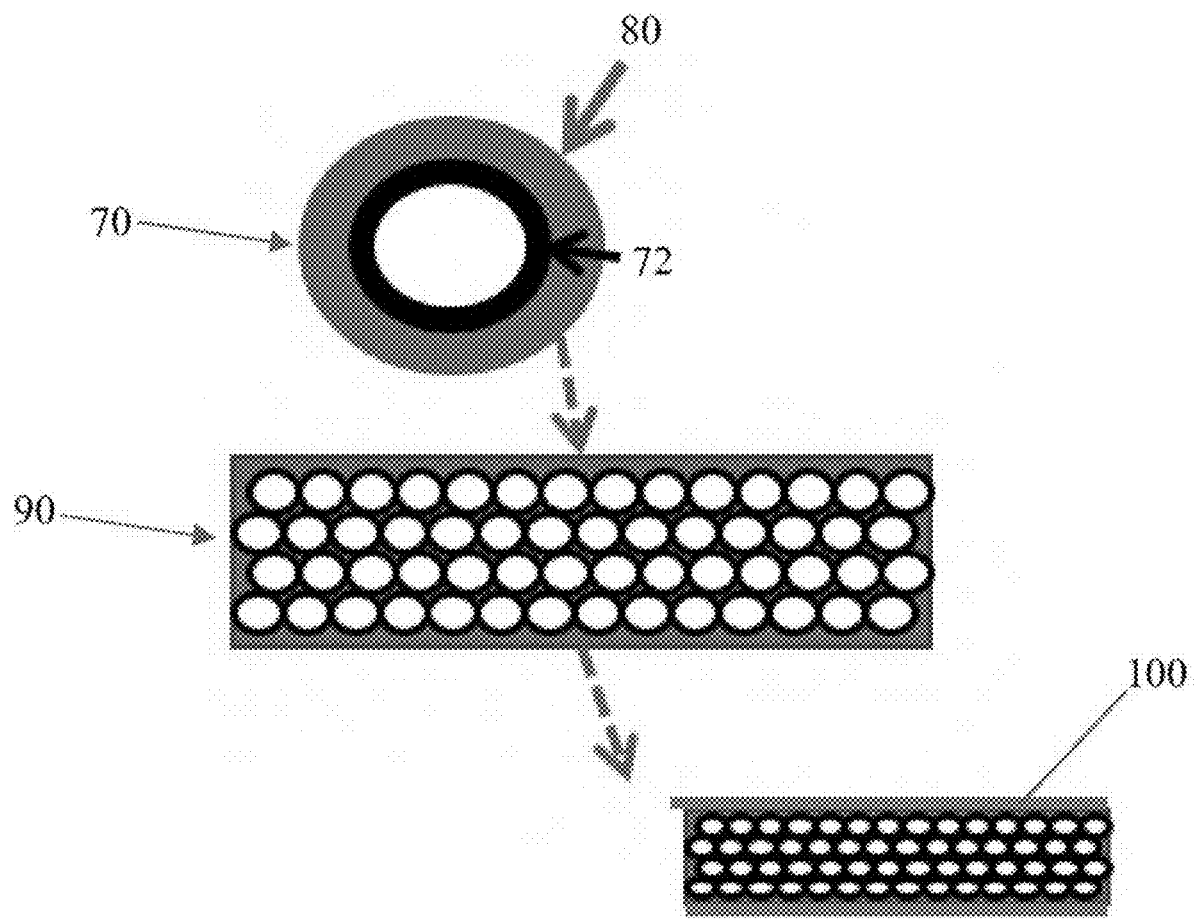
FIG. 7 illustrates a typical three-phase syntactic composite structure along with one method to manufacture such a composite in accordance with the present invention.

The structured three-phase composite can be formed of a discontinuous gas phase, a discontinuous ceramic phase or phases (of which some of the phase surrounds the gas phase), and a continuous metallic phase. The most common form of the structured three-phase composite is referred to as a syntactic composite, in which the gas phase is spherical and normally added to the metal during processing as ceramic hollow microspheres. FIG. 7 illustrates a typical three-phase syntactic composite structure along with one non-limiting method to manufacture such composite. In general, the structured three-phase composite can be fabricated by powder metallurgy techniques or via melt casting techniques. As illustrated in FIG. 7, a hollow ceramic microballoon 70 is provided that includes a cavity 72 which is filled with a gas such as air. The outer surface of the microballoon is coated with a metal material 80. The type of coating process used, the composition of the metal coating, and the thickness of the metal coating will depend on the final application for the formed three-phase composite. The coated microballoon is then consolidated together to formed the composite 90. An additional metal 100 can be added during the consolidation process.

Due to the high density difference between the microballoons and the metal phase, and the reactivity of materials at high temperatures, higher temperature materials (including titanium, niobium alloys (C103, CB752), molybdenum (TZM), tungsten, tantalum, nickel alloys, and superalloys such as IN909, IN718, MA956, IN625) can be fabricated using powder metallurgy techniques. Lower melting and lower density materials, such as magnesium and aluminum can be manufactured using casting techniques such as thixo-molding (semi-solid forming), squeeze casting, pressure or pressureless infiltration casting, or even stir casting. Powder metallurgy techniques include spark plasma sintering, other field-assisted sintering, pressureless sintering, hot pressing, hot isostaic pressing, injection molding, and other powder metallurgy techniques.

To provide strengthening during pressing to prevent crushing of the more fragile microballoons, control over the powder and the balloon-forming materials is generally required. Several techniques have been demonstrated, including adding a metal coating by such techniques as powder coating (wurster or other encapsulation technique), with or without presintering, CVD or other vapor solid coating, electroplating, molten salt plating, and other techniques. One non-limiting technique is powder encapsulation through a mixing process, such as wurster or other fluid bed coating, or ribbon or high shear blending of a ceramic or preceramic polymer balloon, metal powders, a clean burning (thermal removal) or easily removed binder such as PEG, wax, polysacharrides, and other low ash content or easily vaporized binders, and a solvent. In one non-limiting embodiment, heated balloons are added to a bed of solid binder plus metal powder, which is adhered to the surface. Wax, PVB (polyvinyl butyral), and other low melting binders can be used in that process. A binder can be applied to the microballoon surface and heated to its melting point; the binder-coated balloon is then added to a bed of metal powder. In general, the metal powder size is less than $1/10^{th}$ of the microballoon size, and typically less than $1/50^{th}$ of the microballoon size.

Using the powder or metal-coated ceramic microballoons, additional metal is added by blending. Normally, the mixing is used to fill between the ceramic balloons to maximum green packing density. Multiple size balloons can be used for similar purposes to fill intersticies, generally with particle cuts $1/4^{th}$-$1/6^{th}$ of the prior size cut.

For melt-infiltrated materials, a wetting coating can be used for infiltration techniques and for other casting (thixo-casting). This wetting coating can be a ceramic such as TiN or tungsten, but is most commonly a eutectic-forming or active metal. The wetting coating can be added as a powder or coated onto the surface. The metals can include the matrix metal, zinc, nickel, copper, titanium, silicon, palladium, among others. Most often, active metals (titanium, silicon, zirconium, palladium) are used to enhance wetting.

To control separation of the gas and ceramic phases, it is desirable to ensure that the ceramic phases are not contiguous (not touching). In most cases, a contiguity below 0.2, and generally below 0.1 or 0.05 is desired. The desired contiguity can be controlled by wetting, powder mixing, and/or by adding a powder coating to separate the microballoons during the infiltration processes. The desired contiguity can also be achieved or enhanced by post-fabrication deformation processing, such as by constrained rolling or forging.

In one non-limiting embodiment, the ceramic microballons are coated with a metal or metal alloy powder and then melt infiltrated with the matrix material. The powder-coated balloons can be presintered or added to a container and constrained while infiltration takes place; however, this is not required.

The microballoons can be made from a low thermal conductivity ceramic and generally include amorphous or glassy ceramics including carbon, $Si_3N_4$, SiC, SiOC, $SiO_2$, $Al_2O_3$, or $ZrO_2$. Lower densities are desirable, but should be strengthened or properly distributed since they are also lower in strength. Where density is less of an issue, such as ground-based thermal energy storage systems, cenospheres or other low cost glass or ceramic spheres can be used.

For titanium, niobium, aluminum, magnesium, and superalloy three-phase composites that are useful for cryotanks and hypersonic structures, glassy carbon or preceramic-derived ceramic microspheres can be used. These types of microspheres generally have a bulk density of less than 0.2 g/cc, and typically less than 0.05 g/cc, with microspheres sizes ranging from 20-200 microns, and typically less than 100 microns. For heavy ceramic spheres, high melting glass such as borosilicate or sol-gel-derived silica, or cenespheres aluminosilicate microspheres can be used. These types of material are more rigid and can be processed with less attention to precoating or premixing before infiltration or pressing.

Properties of typical three-phase composite systems in accordance with the present invention are illustrated in Tables 1-4.

For improved corrosion resistance (mainly oxidation) and to increase temperature limits, the structured three-phase composite thermal structure can be coated. For hypersonic and other high temperature structures, a thermal barrier coating such as, but not limited to, mullite, BSAS or other aluminosilicates, or zirconia (generally yttria-stabilized zirconia) can be applied. These are generally applied between 10-100 mils (0.01"-0.1") using plasma spray processes; solution spray or slurry coating can also be used.

Oxidization coatings can be used and typically depend on the materials system. For cryotanks, a magnesium structured three-phase composite can be used, but generally requires coatings for $H_2$ and $LO_2$ resistance. Aluminum coating or surface layers, formed during fabrication (such as by roll-bonding aluminum sheet), or applied by cold spray, can be used. For titanium systems, MCrAlY or Ni—Cu—Cr—Al alloy coatings applied by thermal spray, PVD, or slurry coating are very effective. For niobium alloys, silicide slurry coatings containing chrome and silicon, such as R512E from HiTempco™ are very effective. Titanium-chromium-silicon, and vanadium-chromium-silicon can be used, but molybdenum-, tungsten-, and iron-containing silicide systems can also be effective. For superalloy and nickel-based alloy systems, MCrAlY coatings and diffusion coatings, including those applied by pack aluminizing, can be used. For molten salt storage systems, three-phase composites made from nickel-based alloys, such as Haynes420, exhibit excellent resistance to molten salts. Additional aluminizing, or using a lower cost iron alloy with a graded, coated, or layered high nickel alloy surface can be used for operation above 650° C.

EXAMPLES

Example 1: A high speed vehicle airframe panel was designed using a coated syntactic CB752 niobium structure. The structure included a CB752 niobium alloy three-phase composite that is fabricated by premixing 50 vol. % 60 micron D50 glassy carbon microballoons with 25 vol. % 1-10 micron powder mixture of 87.5 wt. % $NbH_2$, 10 wt. % tungsten, and 2.5 wt. % zirconium (as $ZrH_2$) using a spray-coating technique using 2% of 3000 MW PEG in acetone to adhere them to the microballons and then subsequently blending in an additional 25 vol. % of 325 mesh prealloyed CB752 (niobium-10 wt. %-2.5 wt. % zirconium) powder. The material was isostatically formed at 4500 psig compaction force using rubber molds into a 1" thick, curved panels of 20"×16" dimensions. After vacuum sintering at 1525° C. for 4 hours, the material was machined into an isogrid panel. The panel was coated with a commercial RT512E slurry coating from Hitempco Inc. and the top surface was further coated with a zirconia ($ZrO_2$)— based thermal barrier coating using a typical atmospheric plasma spray application process. The panels were mechanically attached (e.g., bolted, etc.) to titanium bulkheads to form a biconic surface for a hypersonic vehicle airframe. Surface temperature capabilities of 2500-2800° F. for 10-1000 hour life ratings were achieved for the hypersonic vehicle airframe.

Example 2: A three-phase composite panel was fabricated using powder metallurgy processing from IN909 alloy (35-40 wt. % nickel, 12-14 wt. % cobalt, 4.3-5.2 wt. % niobium, 1.3-1.8 wt. % titanium, 0.25-0.5 wt. % silicon, 0.15 wt. % max aluminum, 0.06 wt. % max carbon, balance iron) powders using the sequence described in Example 1, but sintered at 1280° C., and a zirconia thermal barrier coating was applied to the outer mold line surface. The panel was suitable for long term use at 1600° F.

Example 3: Isogrid panels of Haynes420 were fabricated using a powder metallurgy processing as described in Example 1, except the materials were sintered by hot isostatic pressing at 3000 psig at 1080° C. 3'×3' curved panels were molded to near net shape, with 0.75" thick facesheets and 2.5" long (thick—axial direction)×0.75" wide stringers spaced at 8" intervals. The panels were mechanically assembled onto a carbon steel frame using steel standoffs and the intersticies filled with high efficiency insulation (kaowool) to a thickness of 6". An additional 12" of rigid isocyanate insulation was applied to the outer section and covered with an aluminum weather shield. At the panel intersticies, the gaps were welded closed with 420 welding rods (0.28 wt. % carbon, 0.42 wt. % manganese, 0.37 wt. % Si, 0.15 wt. % molybdenum, 0.03 wt. % S, 13.13 wt. % chromium, balance iron) using TIG welding techniques. These panel were used in a tank construction and were useful for thermal energy storage to as high as 800° C. using mixed chloride salts.

Example 4: Magnesium three-phase composite cryotanks were fabricated by melt infiltrating a calcium-modified AZ61 alloy containing 2 wt. % calcium and 1 wt. % cesium into a 45 vol. % SiOC microballoon preform space using prealloyed AZ61 (92 wt. % manganese, 5.80-7.2 wt. % aluminum, 0.4-1.5 wt. % zinc, 0.15 wt. % manganese, 0.1 wt. % silicon, 0.05 wt. % copper, 0.005 wt. % nickel, 0.005 wt. % iron)+titanium powders applied (blended) with the balloons using squeeze casting. The 2" thick billets were roll-reduced using constrained rolling at 450° C. to ¾" thickness, then creep-formed to form a curved structure, and then machined into isogrid panels with 0.125" thick surface with ½"×½" stringers arranged hexagonally at 6" spacing. The inner surface was cold sprayed with commercially pure aluminum to a thickness of 0.01". The isogrid panels were assembled into a magnesium alloy frame. The panel interfaces were arc welded and then overcoated with aluminum using a portable cold spray system. The finished tank was then further overcoated with 0.3" of rigid polyisocyanate insulation to provide additional insulation. A 52% weight savings over an aluminum cryotank, and a 12% weight savings over a composite cryotank was achieved.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed is:

1. A three or more phase composite which includes a ceramic phase, a non-solid phase, and a metal phase that includes niobium, said non-solid phase and said ceramic phase are segregated into isolated pockets forming a discontinuous phase in said composite, said metal phase is continuous phase in said composite, said composite having a compression modulus that is at least 25% less than a compression modulus of said metal forming said metal phase, said composite also having a thermal conductivity that is at least 40% less than a thermal conductivity of said metal that forms said metal phase, said composite having a density that is at least 20% lower than a density of said metal that forms said metal phase.

2. The three-phase composite as defined in claim 1, wherein a plurality of said ceramic phase is formed of ceramic particles that include a central cavity or plurality of cavities that are filled with a portion of said non-solid phase.

3. The three-phase composite as defined in claim 1, wherein said ceramic phase is formed of one or more materials selected from the group consisting of carbon, SiAlON, $Si_3N_4$, SiC, SiOC, $SiO_2$, $Al_2O_3$, aluminates, zirconates, aluminosilicates, and $ZrO_2$.

4. The three-phase composite as defined in claim 1, wherein said non-solid phase does not include a gas or includes one or more gasses selected from the group consisting of air, noble gasses, and nitrogen.

5. The three-phase composite as defined in claim 1, wherein said ceramic forms 5-35 vol. % of said composite.

6. The three-phase composite as defined in claim 1, wherein said non-solid phase constitutes 10-40 vol. % of said composite.

7. The three-phase composite as defined in claim 1, where the metal phase also incorporates 1-20 vol. % additional phases including gas porosity or ceramic or intermetallic phases.

8. The three-phase composite as defined in claim 1, wherein at least a portion of a ceramic material of said ceramic phase is coated with a metal material prior to formation of said composite.

9. The three-phase composite as defined in claim 1, further including a coating or surface modification on an outer surface of said composite to improve corrosion/oxidation protection of said composite, said coating includes one or more materials selected from the group of iridium, platinum, rhenium, rhodium, silicides, MCrAl, MCrAlY, aluminum, aluminum alloy, and chromium alloys.

10. The three-phase composite as defined in claim 1, further including a coating or surface modification on an outer surface of said composite to increase surface temperature limits of said composite by about 50-250° C.

11. The three-phase composite as defined in claim 10, wherein said coating is applied by a process that creates a bond between said coating and said outer surface of said composite that is at least 5000 psig strength.

12. The three-phase composite as defined in claim 1, wherein metal phase further includes one or more metals selected from the group consisting of magnesium, aluminum, vanadium, titanium, calcium, manganese, zirconium, lithium, nickel, iron, molybdenum, tantalum, hafnium, and tungsten.

13. The three-phase composite as defined in claim 1, wherein said composite includes a corrosion-resistant coating.

14. The three-phase composite as defined in claim 1, wherein an outer surface of said composite includes insulation.

15. The three-phase composite as defined in claim 14, wherein said insulation includes one or more materials selected from the group consisting of rigid polyurethane and isocyanate foams, insulation blankets, and aerogel-containing insulation blankets, molded refractories.

16. The three-phase composite as defined in claim 1, wherein said composite has a ductility at room temperature (25° C.) that is greater than about 2% strain to failure.

17. The three-phase composite as defined in claim 1, wherein said composite has a ductility at cryogenic or elevated temperatures greater than about 2% strain to failure.

18. The three-phase composite as defined in claim 1, wherein said composite is designed for use above 700° C. surface temperature.

19. The three-phase composite as defined in claim 1, wherein said composite is fabricated using powder metallurgy or casting processes.

20. A composite that includes a ceramic phase, a non-solid phase, and a metal phase; said non-solid phase and said ceramic phase are segregated into isolated pockets forming a discontinuous phase in said composite; said metal phase is continuous phase in said composite; said ceramic phase is formed of one or more materials selected from the group consisting of carbon, SiAlON, $Si_3N_4$, SiC, SiOC, $SiO_2$, $Al_2O_3$, aluminates, zirconates, aluminosilicates, and $ZrO_2$; said metal phase includes niobium, aluminum; said non-solid phase formed of a) a vacuum in one or more cavities in said composite, and wherein said one or cavities is located in said metal phase and/or said ceramic phase, and/or b) a low thermal conductivity gas, and wherein said low thermal conductivity gas includes one or more gases selected from the group of air, one or more noble gasses, and nitrogen; said ceramic phase constitutes 5-35 vol. % of said composite; said non-solid phase constitutes 10-40 vol. % of said composite; a plurality of said ceramic phase is formed of ceramic particles that include one or more cavities that are filled with a portion of said non-solid phase; said metallic phase forms about 1-20 vol. % of the composite; said composite having a compression modulus that is at least 25% less than a compression modulus of said metal forming said metal phase, said composite also having a thermal conductivity that is at least 40% less than a thermal conductivity of said metal that forms said metal phase, said composite having a density that is at least 20% lower than a density of said metal that forms said metal phase.

21. The composite as defined in claim 20, wherein at least a portion of a ceramic material of said ceramic phase is coated with a metal material prior to formation of said composite.

22. The composite as defined in claim 20, further including a coating or surface modification on an outer surface of said composite to improve corrosion/oxidation protection of said composite, said coating includes one or more materials selected from the group of iridium, platinum, rhenium, rhodium, silicides, MCrAl, MCrAlY, aluminum, aluminum alloy, and chromium alloys.

23. The composite as defined in claim 20, wherein said composite includes a corrosion-resistant coating.

* * * * *